United States Patent [19]
Williams

[11] 3,839,938
[45] Oct. 8, 1974

[54] BOWED STRING INSTRUMENT TRAINER

[76] Inventor: Garth M. Williams, 1093 Adderly St., North Vancouver, British Columbia, Canada

[22] Filed: Apr. 16, 1973

[21] Appl. No.: 351,330

[52] U.S. Cl. ................................. 84/465, 84/282
[51] Int. Cl. ........................................ G09b 15/06
[58] Field of Search ............................ 84/281–283, 84/465, 467–469

[56] References Cited
UNITED STATES PATENTS
1,673,996   6/1928   Rathsach .............................. 84/282

Primary Examiner—Richard B. Wilkinson
Assistant Examiner—John F. Gonzales
Attorney, Agent, or Firm—Fetherstonhaugh & Co.

[57] ABSTRACT

A device for training the hand of a bowed string instrument player to correctly hold the bow of the instrument in the form of an element which can be held in the palm of the hand and around which the fingers and thumb are trained by guide channels. The guide channels cause the fingers and thumb to converge in a desired manner to grip the stick of the bow at the frog.

3 Claims, 8 Drawing Figures

PATENTED OCT 8 1974  3,839,938
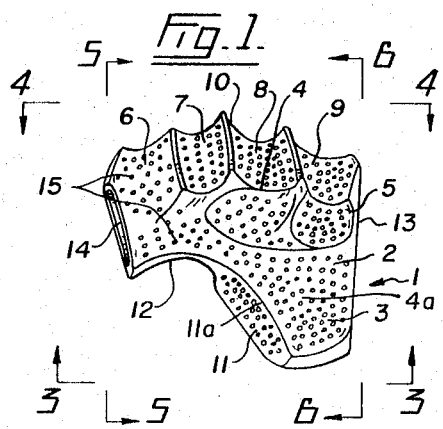
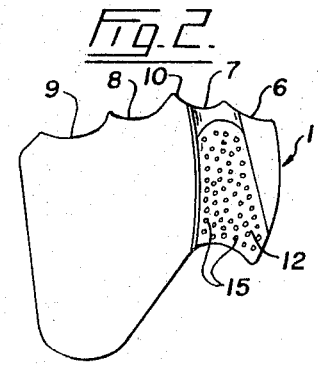
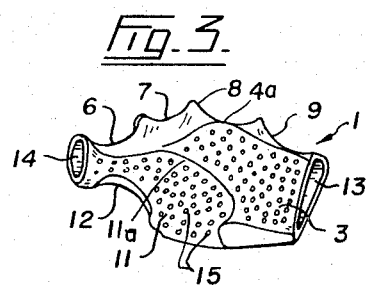
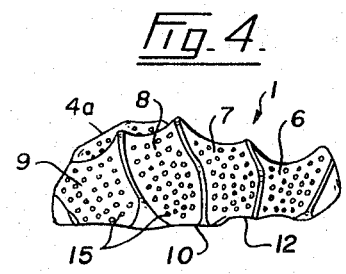
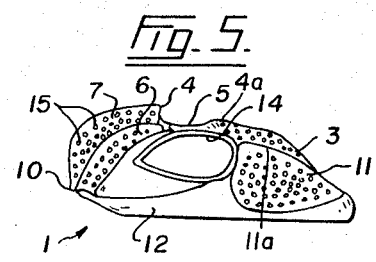
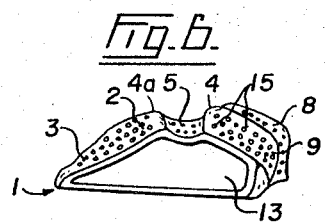
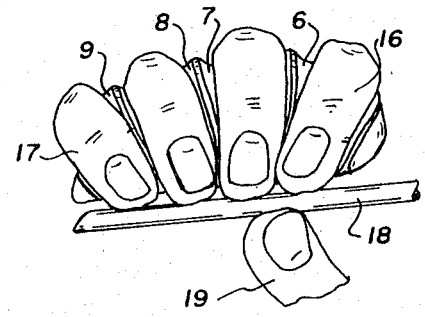
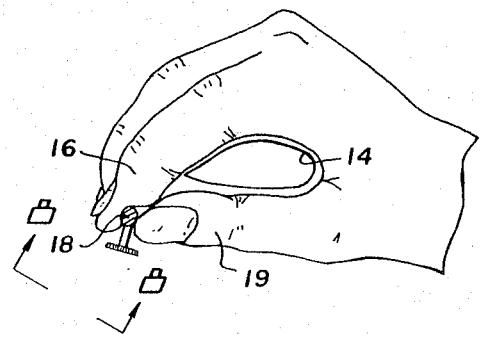

BOWED STRING INSTRUMENT TRAINER

The invention relates to a device for use in training the hand of a bowed string instrument player to adopt a correct position when holding the bow so that the instrument can be correctly bowed.

Although the subsequent description is particularly directed to such a device for training a violin or viola player, anyone skilled in the field will readily be able to make modifications suitable for training a cello or double bass player.

In the training of bowed stringed instrument players, a particular difficulty arises in teaching the student to maintain the correct grip on the bow whilst the instrument is being played. In order to develop a satisfactory bowing technique, the bow must be held between index and fourth fingers of the right hand on the top of the stick at the frog of the bow and the thumb on the underside of the stick at the frog, the thumb being slightly offset from the index finger towards the fourth finger. At the same time, the fingers must be maintained in a slightly spread position as it is only in this position that the muscles can provide sufficient leverage of the bow on the thumb to effect proper bowing of the instrument.

There is a tendency in students of such instruments for them to allow the fingers to flatten into generally parallel relation to the thumb when grasping the bow of the instrument and for the thumb not to be located in the correct offset position in relation to the index finger. Although the teacher of the instrument may frequently stop the student from playing and correct the attitude of the hand, the coordination necessary to maintain the correct position tends to be quickly lost, particularly since the student is at the same time having to concentrate on reading music and also fingering the strings of the instrument with his other hand.

It is among the objects of the present invention to provide means whereby the attitude of the hand of a stringed instrument player is correctly maintained until the muscles of the hand are conditioned to automatically adopt the position, when the device can be dispensed with.

The invention therefore provides a device for use by a bowed string instrument player in training the hand to adopt a predetermined attitude for holding the bow of the instrument, said device comprising an element adapted to be retained between the fingers and thumb of the players hand whilst holding the bow, said element including first guide means on the upper surface for guiding the index and fourth fingers into predetermined spaced engagement with one side of the frog of the bow, and second guide means on the undersurface, for guiding the thumb into engagement with the other side of the frog of the bow at a position offset from the index finger towards the fourth finger.

The invention will now be further described with reference to the accompanying drawings in which, FIG. 1 is a plan view of a device according to the invention, FIG. 2 is a bottom plan view of the device of FIG. 1, FIG. 3 is a rear elevation as viewed from the line 3—3 of FIG. 1, FIG. 4 is a front elevation as viewed from the line 4—4 of FIG. 1, FIG. 5 is a side view on the line 5—5 of FIG. 1, FIG. 6 is an opposite side view on the line 6—6 of FIG. 1, FIG. 7 is a view similar to FIG. 5, but showing the device, together with the bow of an instrument when grasped by the hand in a desired playing attitude, and FIG. 8 is a front elevation as viewed from the line 8—8 of FIG. 7.

Referring first to FIGS. 1 to 6 of the drawings, the device shown comprises a moulded element or body 1 formed generally for reception in the palm of the hand and envelopment by the fingers and thumb.

Specifically, the upper surface 2 of the element or body is formed with a rearward portion 3 for cooperation with the palm of the hand and which rises to a ridge 4 for location at the roots of the fingers. A transverse depression 5 is formed immediately behind the ridge 4 for accommodating with the fleshy pad which forms adjacent to the roots of the fingers when the hand is partially clenched. This depression extends transversely of portion 3 behind ridge 4, leaving a hump 4a in the adjacent part of said portion 3, as clearly seen in FIGS. 3 to 6. This hump fits in said hand palm. Four finger guide channels 6, 7, 8 and 9 extend side by side forwardly from the ridge 4 and hump 4a to the forward edge 10 of the element for reception of the index, second, third and fourth fingers respectively. The channels 6, 7, 8 and 9 curve generally forwardly and downwardly from ridge 4 towards edge 10, see FIGS. 4 and 5, and are generally of sufficient length to accommodate the proximal and medial phalanges of the fingers. Thus the distal phalanges project at least in part beyond the edge 10 of the element when held in the hand.

The rear end of the element is cut away at 11 at one side of the body for reception of the pad of muscular tissue at the root of the thumb and the undersurface of the element is formed with a guide channel 12 extending from the cut-away portion 11 and terminates at edge 10, as best seen in FIG. 2. The bottom of cut-away portion 11 is in the form of a depression 11a, as shown in FIGS. 1 and 3. The guide channel 12 is of such a length that it accommodates the proximal and approximately half of the distal phalanges of the thumb so that a portion of the thumb projects for engagement with the bow. As best seen in FIG. 2, the guide channel 12 terminates at the edge 10 at a position beneath and between the finger guide channels 6 and 7.

The element 1 is moulded from any suitable plastic material as either a solid or hollow artefact. The embodiment shown is a hollow blow moulding formed with open sides 13 and 14. The surfaces of the element which come into contact with the hand when in use are preferably perforated as indicated at 15. Ventilation is thus provided through the open ends 13 and 14 and the perforations 15 which checks the development of perspiration.

If desired, the element may be covered with a moisture adsorbent material, for example in the form of a removable cover made of cotton or felt fabric.

Turning now to FIGS. 7 and 8, it will be seen that the device of the invention maintains the fingers and thumb in a predetermined relation such that the index finger 16 and the fourth finger 17 engage the stick 18 at the frog of the bow in spaced relation, with the fourth finger engaging the end of the stick. At the same time, the thumb 19 is brought into engagement with the underside of the stick at the frog, in a position slightly offset from the index finger towards the fourth finger. The configuration of the guide channels 6, 7, 8 and 9 ensure that the hand adopts a slightly spread attitude between the fingers at the second joint for knuckles thereof, as shown in FIG. 8, whereby the muscles of the hand can work correctly to develop a proper bowing technique. In addition to this, hump 4a fits into the palm of the hand at this time to arch the hand to help maintain the fingers in their proper curved position above and relative to the thumb, as clearly illustrated in FIG. 7.

I claim:

1. A device for use by a bowed string instrument player by training the hand to adopt a predetermined attitude for gripping the stick of the bow of the instrument, said device comprising a body shaped to be held in the hand, a hump on the upper surface of the body to fit in the palm of the hand, a plurality of finger channels side by side in said upper surface of the body, one channel for each of the four fingers, and extending from near said hump to a forward end of the body, said channels being arranged to receive the index finger and the remaining three fingers of the hand, said finger channels curving outwardly and downwardly from the hump and being arranged to spread apart the fingers therein adjacent the second joints of said fingers such that when a properly sized device is grasped, the second joints of the fingers are spread apart, a thumb channel in a lower surface of the body and terminating at said end beneath and substantially between the finger channels for the index finger and the next finger, a transverse depression in the upper surface of the body between said hump and the finger channels for accommodation of the fleshy pad of said hand which forms adjacent the roots of the fingers when the hand is arched by the jump, and said body being formed with a cut-away portion at one side thereof and extending substantially from a rear end of the body to the thumb channel for reception of the muscular tissue at the root of the thumb, the bottom of said cut-away portion being in the form of a depression facing substantially towards said one side of the body, whereby when the device is grasped, said hump arches the hand and fingers in their respective channels above the thumb which is positioned in its channel below and between the index finger and said next finger with the tips of the fingers and thumb extending beyond the channels of the device in position for the tips of the first and fourth flanges to contact the top side of the stick at the frog of the bow and for the tip of the thumb to contact the underside of the stick at the frog of the bow, the thumb being slightly offset from the index finger towards the fourth finger.

2. A device as claimed in claim 9, wherein said body is covered with a moisture absorbent material.

3. A device as claimed in claim 2, wherein said moisture absorbent material comprises a removable cover.

* * * * *